(12) United States Patent
Harrison et al.

(10) Patent No.: US 9,680,901 B2
(45) Date of Patent: Jun. 13, 2017

(54) METHOD, APPARATUS AND NON-TRANSITORY COMPUTER MEDIUM FOR ENCODING DATA OF A MEDIA FILE

(71) Applicant: Openwave Mobility, Inc., Redwood City, CA (US)

(72) Inventors: Declan Harrison, Belfast (IE); Christopher Brown, Ballygowan (IE)

(73) Assignee: OPENWAVE MOBILITY, INC., Redwood City, CA (US)

( * ) Notice: Subject to any disclaimer, the term of this patent is extended or adjusted under 35 U.S.C. 154(b) by 478 days.

(21) Appl. No.: 13/829,800

(22) Filed: Mar. 14, 2013

(65) Prior Publication Data

US 2014/0281001 A1 Sep. 18, 2014

(51) Int. Cl.

| | | |
|---|---|---|
| G06F 15/16 | (2006.01) | |
| H04L 29/06 | (2006.01) | |
| H04L 29/08 | (2006.01) | |
| H04N 21/2343 | (2011.01) | |
| H04N 21/658 | (2011.01) | |
| H04N 21/84 | (2011.01) | |
| H04N 21/845 | (2011.01) | |
| H04N 21/854 | (2011.01) | |
| H04N 21/43 | (2011.01) | |
| H04N 19/40 | (2014.01) | |
| H04N 21/434 | (2011.01) | |

(52) U.S. Cl.
CPC .......... *H04L 65/607* (2013.01); *H04L 65/605* (2013.01); *H04L 67/2823* (2013.01); *H04N 21/2343* (2013.01); *H04N 21/4307* (2013.01); *H04N 21/6581* (2013.01); *H04N 21/84* (2013.01); *H04N 21/8455* (2013.01); *H04N 21/85406* (2013.01); *H04L 65/608* (2013.01); *H04L 67/02* (2013.01); *H04N 19/40* (2014.11); *H04N 21/4341* (2013.01)

(58) Field of Classification Search
CPC H04N 19/40; H04N 21/85406; H04L 65/605; H04L 65/607
USPC ....................................................... 709/231
See application file for complete search history.

(56) References Cited

U.S. PATENT DOCUMENTS

| | | | | |
|---|---|---|---|---|
| 6,801,294 | B2 * | 10/2004 | Jo ................................... | 352/44 |
| 7,558,760 | B2 * | 7/2009 | Fang et al. ...................... | 705/57 |
| 2005/0207442 | A1 * | 9/2005 | Zoest ............... | G11B 20/00086 370/465 |

(Continued)

FOREIGN PATENT DOCUMENTS

| | | |
|---|---|---|
| WO | 2009149564 A1 | 12/2009 |
| WO | 2012142507 A1 | 10/2012 |

*Primary Examiner* — June Sison
*Assistant Examiner* — Dixon Dabipi
(74) *Attorney, Agent, or Firm* — EIP US LLP

(57) ABSTRACT

A method, apparatus and non-transitory computer medium are provided for encoding data of a media file for playback by a user equipment in a communications network. A request for a range of encoded data is received from the user equipment, the encoded data to be generated by encoding data from an original media file. The request for a range of encoded data is converted into a request for a range of original data from the original media file. The range of original data is retrieved and the range of original data is encoded to generate encoded data. The requested range of encoded data, from the generated encoded data, is provided to the user equipment.

13 Claims, 13 Drawing Sheets

(56) References Cited

U.S. PATENT DOCUMENTS

| | | | |
|---|---|---|---|
| 2006/0080167 A1* | 4/2006 | Chen | G06Q 30/02 |
| | | | 705/14.68 |
| 2008/0207442 A1* | 8/2008 | Pfeifer et al. | 502/416 |
| 2009/0122196 A1* | 5/2009 | Chung | 348/586 |
| 2010/0268836 A1 | 10/2010 | Jabri et al. | |
| 2011/0090953 A1* | 4/2011 | Melnyk et al. | 375/240.03 |
| 2011/0096828 A1 | 4/2011 | Chen et al. | |
| 2011/0219008 A1* | 9/2011 | Been et al. | 707/742 |
| 2012/0263241 A1 | 10/2012 | Swenson et al. | |
| 2012/0265847 A1 | 10/2012 | Swenson et al. | |
| 2012/0265853 A1 | 10/2012 | Knox et al. | |
| 2013/0254631 A1* | 9/2013 | Luby et al. | 714/776 |
| 2014/0247887 A1* | 9/2014 | Brueck et al. | 375/240.26 |

\* cited by examiner

METHOD, APPARATUS AND NON-TRANSITORY COMPUTER MEDIUM FOR ENCODING DATA OF A MEDIA FILE

TECHNICAL FIELD

The present invention relates to a method, apparatus and non-transitory computer medium for encoding data of a media file for playback by a user equipment in a communications network.

BACKGROUND

It is now commonplace for users to download media files, for example video and/or audio files, from Internet servers to play on their computing devices.

Various different techniques for downloading and playing media files are known. In perhaps the most basic technique, users must download a media file in its entirety before executing the media file on their computing device to play the file.

Alternative techniques have been developed that enable users to download media from servers and begin playing the files without first having to wait for the entire file to download.

One such technique is commonly referred to as media streaming. Generally, media streaming uses a stateful protocol, for example, the Real Time Streaming Protocol (RTSP), to establish and control media sessions between a client device and a streaming media server and one or more further protocols, for example, the Real-Time Transport Protocol (RTP) and the Real-time Control Protocol (RTCP) for media stream delivery. Once a session between the client device and the streaming server has been established, the server sends the media as a continuous stream of packets over, for example, the User datagram Protocol (UDP).

Hyper Text Transfer Protocol (HTTP) progressive download (PD) is an alternative technique to media streaming that enables users to download media files from standard HTTP servers to their computing devices and begin playing the files before the entire file has downloaded. Typically, when a specified amount of the media file has been buffered at a buffer in the client device, the media begins to play. Client devices that can support HTTP can seek to positions within the media file by performing byte range requests to the server. Unlike media streaming, HTTP progressive download is stateless, that is to say, if a HTTP client requests some data using a HTTP request, the server responds by sending the data and the transaction is terminated. Accordingly, each separate HTTP request for data in a media file is handled as a standalone operation.

When a media file is provided by way of streaming or progressive download to a client device over a communication network, the media file may require optimisation in the network to enable continuous playback at the client device. The optimisation may be necessary because of limitations of the user device (e.g. display resolution, display size, supported video format, and so on) and/or network limitations (e.g. available bandwidth).

Such optimisation may involve intercepting the media file en route from an origin server to a requesting user device and compressing the media content in the file further by re-encoding the media content, for example, at a lower bit rate. Such optimisation may involve transcoding and/or transrating the media content by changing one or more of the media content's attributes, for example, bit rate, resolution, frame rate, encoding protocol etc. The optimisation can act to reduce processing required by the user device and also to reduce the use of network resources by, for example, sending a smaller, more compressed file (i.e. having fewer bytes) to the device then what would have been provided had no optimisation taken place.

A proxy server in an access network can be used to intercept requests for content from a user device and corresponding responses from an origin server and optimising the content from the origin server before sending it to the user so that the content is optimised for the user device.

However, many file formats such as the ISO base media format (as defined in the standards document ISO/IEC 14496-12 established jointly by ISO, the International Standards Organisation, and IEC, the International Electrotechnical Commission), MPEG-4 Part 14 or MP4 (as defined in the standards document ISO/IEC 14496-14, where "MPEG" is the "Moving Pictures Expert Group"), quick time file format (MOV), Third Generation Partnership Project (3GPP), etc. require that information regarding the entire media file be first known in order to execute the media file for playback. For example, an information or index specifies the size and location of every audio sample and/or video frame of the media content in the media file. Where a media file is to be streamed to a computing device without first being optimised en route, such an index will be received by the computing device before it receives the actual media content and accordingly the computing device can execute a streaming playback of the media file based on the index. However, where a media file requires optimising, the index will only be created once the entire file has been optimised. A proxy server would therefore need to first download and optimise the entire media file in order to compile the index of the optimised media file for sending to the computing device (i.e. in order to subsequently allow an execution of the streamed optimised media file). Therefore, for at least these particular file formats, a user of a computing device will have to first wait for the file to be downloaded and optimised at the proxy server before they can then retrieve the newly created index for the optimised media file and subsequently execute a playback of the desired content.

Alternatively, the proxy server may have already downloaded, optimised and cached a plurality of content files in a pre-emptive manner so that the media files are ready to stream on-demand. However, this places a burden on the server to download, process and cache many content files without having any prior knowledge of which media files are to be requested by a user.

As described herein, a method, apparatus and computer program are provided so as to provide an improved system for providing a media content download for playback in a substantially real-time manner as the media content is downloaded.

SUMMARY

According to a first exemplary embodiment, there is provided a method for encoding data of a media file for playback by a user equipment in a communications network, the method comprising: receiving, from the user equipment, a request for a range of encoded data to be generated by encoding data from an original media file; converting the request for a range of encoded data into a request for a range of original data from the original media file; retrieving the range of original data; encoding the range of original data to generate encoded data; and providing to the user equipment, from the generated encoded data, the requested range of encoded data.

Although the encoded data does not exist at the time that the user equipment makes the request, the user equipment can nevertheless request to receive the encoded data. The conversion allows only the relevant original data, corresponding with the requested encoded data, to be retrieved in order to generate the requested encoded data for sending to the user equipment. Therefore, for example, a user of a user equipment can select an arbitrary point in a video file for playback and only the relevant data corresponding to that selected arbitrary point may be encoded and sent to the user equipment. The method therefore acts to optimise the use of network resources such as bandwidth.

The method may further comprise: generating key frame position data that indicates a position of key frames in the original media file and a position of corresponding encoded key frames in a encoded media file to be generated by encoding the original media file; and using the key frame position data when converting the request for a range of encoded data into a request for a range of original data from the original media file.

The method may further comprise: retrieving first metadata that describes frames in the original media file; generating second metadata that describes frames in the encoded media file to be generated by encoding the original media file; and generating the key frame position data using the first metadata and the second metadata.

The method may further comprise using the first metadata to generate the second metadata.

The original media file may be a video file comprising video key frames interleaved with audio samples associated with the video frames; and wherein the request for a range of original data from the original media file is generated so as to include within the range of original data at least one video key frame and at least one audio sample associated with that video key frame, and wherein the at least one video key frame is the earliest video key frame in the range of original data required to provide to the user equipment, from the generated encoded data, the requested range of encoded data.

The interleaving may be arranged such that the at least one audio sample precedes the at least one video key frame in the range of original data, and wherein the request for a range of original data is generated so that the range of original data is initiated with a further video key frame that precedes the at least one video key frame and the associated at least one audio sample that precedes the at least one video key frame in the range of original data.

The method may be implemented by a server located between the user equipment and an origin server that provides the original media file. The method may comprise: retrieving the range of original data from the origin server.

The request may be a HTTP request and the requested range of encoded data may be provided to the user equipment in a HTTP response.

According to a second exemplary embodiment, there is provided apparatus for encoding data of a media file for playback by a user equipment in a communications network, the apparatus comprising: at least one processor; and at least one memory including computer program code, the at least one memory and the computer program code being configured to, with the at least one processor, cause the apparatus at least to: receive, from the user equipment, a request for a range of encoded data to be generated by encoding data from an original media file; convert the request for a range of encoded data into a request for a range of original data from the original media file; retrieve the range of original data; encode the range of original data to generate encoded data; provide to the user equipment, from the generated encoded data, the requested range of encoded data.

According to a third exemplary embodiment, there is provided a non-transitory computer medium configured to store executable program instructions, which, when executed by an apparatus, cause the apparatus to perform the steps of: receiving, from a user equipment, a request for a range of compressed data of a media file to be generated by compressing data from an original media file, wherein the range of compressed data is for playback by a user equipment; converting the request for a range of compressed data into a request for a range of original data from the original media file; retrieving the range of original data; compressing the range of original data to generate compressed data; and providing to the user equipment, from the generated compressed data, the requested range of compressed data.

According to a fourth exemplary embodiment, there is provided a method for encoding media data for playback by a user equipment in a communications network, the method comprising: receiving, from the user equipment, a request for first media data from a media file to be downloaded to the user equipment for playback in a substantially real time manner; deriving, at least partly based on the request, a requested start position in the media file for downloading the first media data; identifying a video key frame located in the media file before or at the requested start position; determining whether there are one or more audio samples associated with the identified video key frame that precede the identified video key frame in the media file; identifying a further video key frame in the media file, in response to determining that there are one or more audio samples associated with the identified video key frame that precede the identified video key frame in the media file, wherein the identified further video key frame precedes the one or more audio samples in the media file; retrieving second media data from the media file commencing at the identified further video key frame; encoding the second media data retrieved from the media file; and providing encoded media data to the user equipment.

The request for first media data may be a seeking request that begins at a video key frame offset.

The request for first media data may be a non-seeking request that begins at a point other than at a video key frame offset.

The request for first media data may be a range request generated by the user equipment for requesting a range of data for playback in a substantially real time manner.

Further features and advantages of the invention will become apparent from the following description of preferred embodiments of the invention, given by way of example only, which is made with reference to the accompanying drawings.

DETAILED DESCRIPTION

Figure 1:
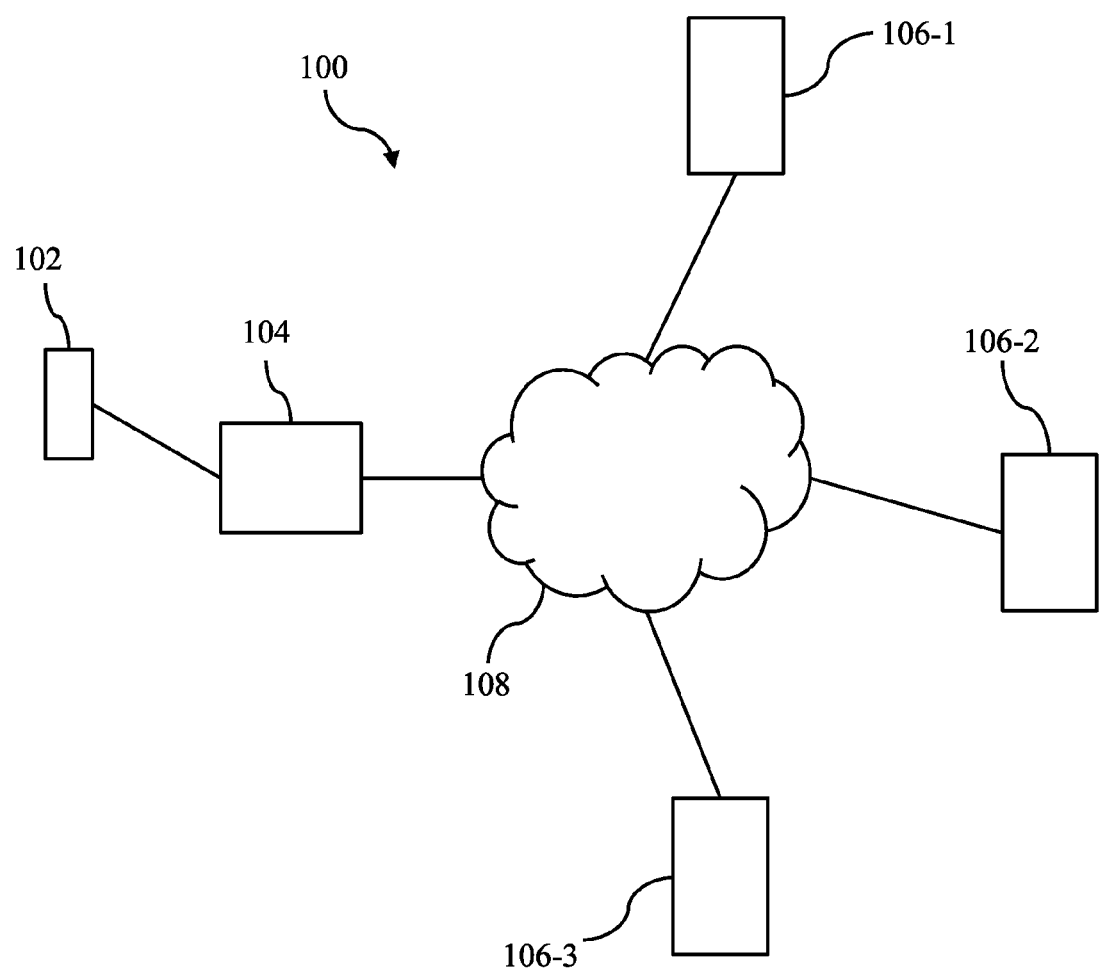
FIG. 1 is a schematic block diagram showing an example of a communications network.

In the following description of exemplary embodiments it should be noted that the term "user equipment" (UE) includes apparatus that are both wireless devices and wired devices. In general, wireless devices include any device capable of connecting wirelessly to a network. This includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc.

A UE, as described herein, may be configured to receive media content from a communications network so as to enable a playback of the media content in substantially real-time manner as the media content is being received, such as by using a streaming or HTTP-PD protocol. It will be appreciated that various other methods or variations of these methods can also be used to achieve the substantially real-time playback of the media content.

In this specification, specific examples may refer to either "streaming" or "progressive download", however it will be appreciated that the invention will apply in general to any other system that uses a download of media content from one network entity to another network entity for substantially real-time playback of the media content.

A container format is a metafile format whose specification describes how different data elements and metadata coexist in a media file. Container formats are commonly used to store digital video and digital audio streams and can also be used to store other data such as still images and subtitles. There are many examples of known container formats including the MP4 format, Quick Time Format and Flash Video.

In a particular but non-limiting example described herein, the UE receives MP4 data in the form of a HTTP progressive download.

An MP4 file is typically arranged in so called "boxes" or "atoms" and comprises at least a "FTYP" box, a "moov" box and an "mdat" box. The FTYP box is a file-type box that identifies which specification (i.e. media type) is the best use of the file as well as a minor version (i.e. more specific version) of that specification. The FTYP box also identifies a set of other specifications with which the file complies. The moov box is a movie box, which comprises sub-boxes defining the metadata for a presentation (i.e. playback of the MP4 by the UE 102). The moov box effectively defines overall information about the MP4 relevant to the entire presentation considered as a whole, and as such defines at least the number of frames, size of each frame and type of each frame contained in the MP4. The mdat box is a media data box, which holds the actual media data for a presentation. The presentation is separated into at least two tracks: one for video and another for audio. Each track has multiple chunks and each chunk has multiple samples. A sample contains all the data associated with a particular timestamp. Thus, a sample may be an audio sample or a video sample. Throughout this specification video samples will be referred to as video frames.

MP4 supports many different types of codecs (e.g. compression formats) including, but not limited to, MPEG-4 Part 10 (H.264) and MPEG-4 Part 2. Generally, compression formats use different frame types to provide for effective video compression, the three major frame types being I-frames (sometimes called Key frames), P-frames (sometimes called Predictive frames) and B-frames (sometimes called Bi-predictive frames).

An I-frame is an independent frame that is a fully specified picture or image. A P-frame is a dependent frame and holds only the changes in the image from the previous frame. A B-frame is also a dependent frame and holds only the differences in an image from a preceding frame and a following frame. Accordingly, I-frames are the least compressible and do not require any other frames in order to be decompressed or decoded. P-frames use data from previous frames to decompress and are more compressible than I-frames. B-frames use both previous and following frames to decompress and get the highest amount of compression. As key frames can be decoded without reference to other data frames, they are typically used as reference frames in digital media playback, such as in fast forward, rewind, and seek operations, so that decoding or decompression of the relevant parts of a media file can occur quickly. For example, some media players may implement high speed fast-forward and rewind playback of a media data stream by playing only key frames. It is noted also that the I-frame may be an instantaneous decoder refresh (IDR) frame that indicates to a decoder that it may empty its reference frame buffers.

Information concerning these frame types, size and the number of each frame type is included in the moov box as discussed above.

Although this specification refers to MP4 as an example of a container format, it will be appreciated that the examples described herein can be applied to any other container format or file type for media content, and in particular, any file type which requires an index to be executed for playback of the file. For example, the examples may be applied to various audio and/or video formats such as AAC (Advance Audio Coding), quick time file format (MOV), Third Generation Partnership Project (3GPP), Windows Media Video (WMV) and so forth.

Some of the examples discussed in this specification, such as those discussed with reference to FIGS. 4 to 7, are concerned with dynamically compressing content for use by a user equipment in a communications network. A user equipment in the communications network can be configured to operate within various types of network, an example of such a network being shown in FIG. 1 of the accompanying drawings. The compression is said to be dynamic or is done "on-the-fly" because portions of the content can be retrieved and compressed for playback without requiring the entire content to be first compressed, as explained in more detail later on with reference to FIG. 6. As such, for example, the user can begin playback of an MP4 in a substantially real-time manner without necessarily having downloaded the whole file to their device.

The compression may be achieved by at least one of encoding, transcoding, transrating and other such optimisation technique that acts to at least reduce the total number of bytes of a media file. The term "encoding" generally refers to the process of configuring a file in a format for execution such as by playback by a user device and could include transcoding, transrating, optimisation, compression, and decoding depending on the context in which the term is used. In the case of transcoding, the format of the data is transformed from one encoding format to another encoding format, such as from an MP4 format to an AVI (Audio Video Interleave) format. In the examples discussed herein, transcoding may occur in a manner such that the format of the media content file is maintained and the transcoding acts to effectively reduce the file size of the media content file (i.e. the media file is transcoded from an MP4 format to an MP4 format having a reduced size). Transrating is where the bitrate of a media stream is changed, for example, by processing an input video stream so that its bitrate is reduced.

The MP4 container format uses an interleaving of video frames with their associated audio samples. The interleaving is done in a manner such that the audio samples that are associated with a particular video frame can be identified quickly, such as when executing the MP4 for playback on a device.

In general, compressors or encoders are not capable of encoding or compressing data to frames that are smaller than a predetermined threshold. This predetermined threshold is typically inherent in the design of the encoder but, in some examples, the predetermined threshold may be dependent on a selected type of encoding operation. As such, when an encoder is told to compress data to a target frame size that is smaller than a specified size that the encoder is capable of handling (i.e. the predetermined threshold), the encoder will end up producing a compressed frame that is bigger than the target frame size. In order to maintain concordance with the target frame size, the encoder must truncate the encoded frame so as to fit within the indicated target frame size. Such truncation may cause problems during playback at a user device, such as causing the playback of the video to skip to a next playable frame, freeze, or cause erroneous artefacts (unexpected image objects and/or effects) to appear in the video.

A numerical example of the situation whereby an encoded or compressed video frame is subjected to such undesirable truncation will now be given. A particular encoder is designed such that it can handle a minimum number of bytes (i.e. a predetermined threshold) in an encoding process. In this example, the encoder has a predetermined threshold of 850 bytes. A particular video frame identified for the encoding process has a size of 1000 bytes. An operator of a proxy server may define a policy whereby a frame optimisation comprises a 25% reduction in size of frames that are to be encoded. The policy may be provided by a Policy and Charging Rules Function (PCRF) module in the network, which may define the desired reduction based on characteristics of either the network (such as congestion, available bandwidth, etc.) or the user equipment (such as display characteristics and/or processing capability, etc.) For example, if the PCRF determines that there is network congestion in the cell in which the user equipment is present, then the desired compression may be large. If there is determined to be no network congestion, then the PCRF may decide not to apply any compression.

In the case where a 25% compression has been defined, the optimisation results in predicting a target frame size of 750 bytes for use by the encoder. However, such a reduced frame size is too small (i.e. less than the predetermined threshold of 850 bytes) for the encoder to handle and the encoder therefore produces an encoded frame of 850 bytes (i.e. the minimum size that the encoder can handle according to the predetermined threshold). The encoded frame is 100 bytes larger than the target frame size and therefore the encoded frame must then be truncated so as to fit within the target frame size of 750 bytes. As above, such truncation produces playback and quality issues and is thus undesirable.

Advantageously, in techniques described herein, such truncation can be avoided by predicting a target frame size based on input frame heuristics, and then biasing the target frame size to a larger value so as to generate a required or desired frame size for use in the optimisation process.

FIG. 1 shows schematically a simplified example of a communications network 100, which may typically comprise, for example, an Internet Protocol Multimedia System (IMS) architecture. The network comprises a plurality of network elements 102, 104, 106, 108. In particular, there are a plurality of UEs 102 (only one shown and described for simplicity of explanation), an intermediate network element (INE) 104, and a plurality of servers 106. The INE 104 is used to intercept messages in the communications network 100 sent between the UE 102 and the servers 106 and can be used to selectively modify such messaging. For example, the servers 106 may host content such as media files and the UE 102 may signal one or more of the servers 106 so as to retrieve such content. The INE 104 may intercept and modify the content before it is passed onto the UE 102. Therefore, the UE 102 is in communication with the INE 104, which in turn, is in communication with each of the plurality of servers 106. The INE 104 is capable of communicating with the plurality of servers 106 via the internet 108. Although in this figure, the INE 104 is shown to be placed between the UE 102 and the internet 108, it will be understood that this is for ease of illustration only and that the INE 104 can be placed at any point in the communications network so that it is capable of intercepting communications between the UE 102 and the servers 106. The UE 102 is capable of communicating with the INE 104 via the internet 108 or via some other communications network.

Figure 2:
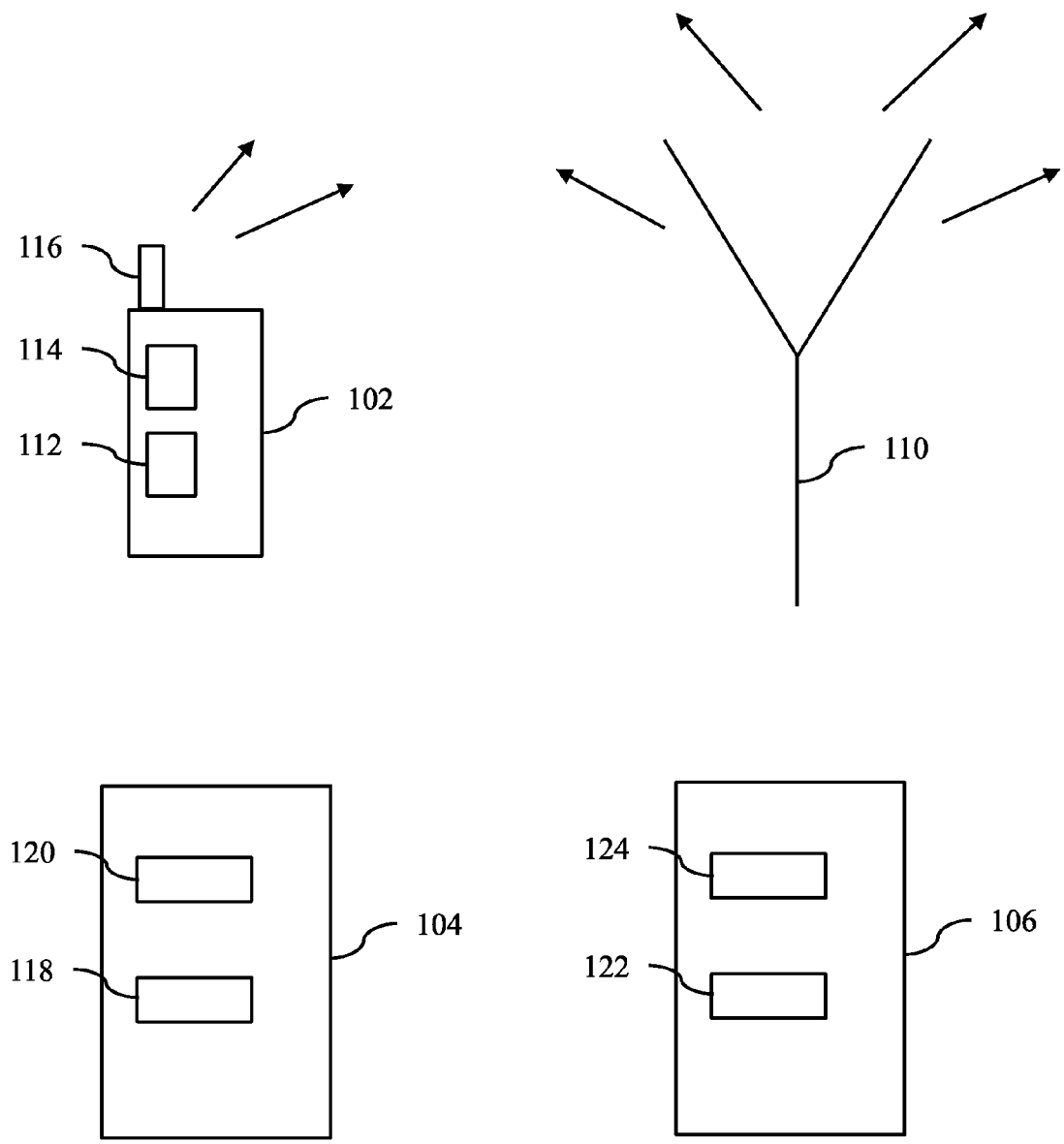
FIG. 2 is a schematic block diagram showing network elements present in the communications network of FIG. 1 in further detail.

FIG. 2 shows schematically a UE 102 such as a mobile phone, an INE 104, a server 106 and a network control apparatus 110 for use in the communications network 100 of FIG. 1. The UE 102 contains the necessary radio module 112, processor(s) and memory/memories 114, antenna 116, etc. to enable wireless communication with the network. The UE 102 in use is in communication with a radio mast associated with the network control apparatus 110. As a particular example in the context of UMTS (Universal Mobile Telecommunications System), there may be a network control apparatus 110 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The network control apparatus 110 (of whatever type) may have its own radio module, processor(s) and memory/memories, etc. Similarly, the INE 104 may have its own radio module 118, processor(s) and memory/memories 120, etc. Similarly, each of the plurality of servers 106 may have their own radio module 122, processor(s) and memory/memories 124, etc.

The INE 104 is a device, network node or module that can be co-located or integrated with existing network architecture. As such, in some examples, the INE 104 may form part of a cellular network. It can also be a stand-alone device, such as a proxy server. The INE 104 is said to be "intermediate" because it is placed in the communications network between the UE 102 and other network elements such as the origin server 106-1, and one or more other servers 106-2, 106-3 which may be associated with third party content providers (i.e. third party in the respect that they are different from an operator associated with the INE 104). The INE 104 is used to intercept signalling or messages from the UE 102 and to determine whether or not any optimisation, for example, compression of content is desirable before being provided to the UE 102. The INE 102 can also be used to determine whether or not access permission is required to allow the UE 102 to access content as requested by the messages. Accordingly, the INE 104 can control whether or not and how content may be provided to the UE 102.

Figure 3:
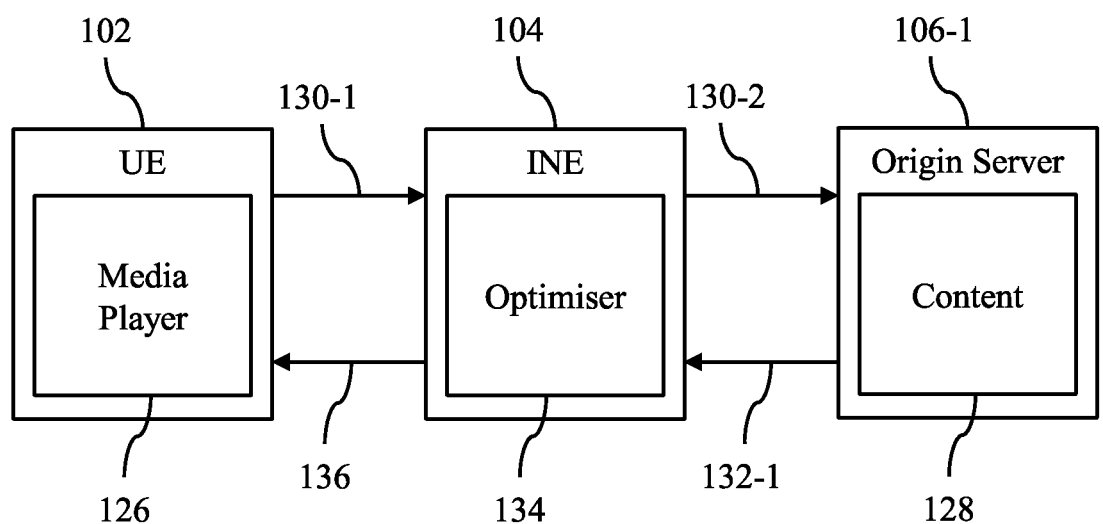
FIG. 3 is a schematic block diagram showing an example of signalling in the communications network of FIG. 1.

As shown in FIG. 3, a UE 102 such as a mobile phone, laptop, desktop computer or the like can operate a media player application 126 in order to access information or media content 128 via the internet 108. For example, the media player application 126 could be dedicated software installed at the UE 102 or a JavaScript application that is loaded in a web browser in response to accessing a specific web page. A user of the UE 102 can enter a uniform resource locator (URL) (commonly referred to as a web page of a website, addressed by the URL) in an input field of a web browser in order to load data from a particular server. The webpage may contain embedded URLs, which can be selected by the user in order to initiate a streaming or download of content 128, such as an MP4 file. The selection of the content 128 may additionally or alternatively be provided via other means such as selection icons or links embedded in the media player application 126 or any other application. The media player application 126 can be loaded and executed by the user directly or can be loaded responsive to a user selection of a particular URL embedded in a web page that indicates an address for streaming or downloading desired content 128.

Upon receiving an indication that a download of content 128 is desired (be it via selection of a URL embedded in a web page or otherwise), the application 126 is caused to send a request message 130-1, such as a hypertext transfer protocol (HTTP) request towards the indicated address/location identified by the URL. The HTTP request may for example use a GET method so that corresponding response contains data in the body of the response, or the HTTP request may use a HEAD method so that the corresponding response does not return data in the body of the response.

In this case, the indicated address points at content 128 stored at an origin server 106-1. The INE 104 can intercept this request message 130-1 and forward it to the appropriate origin server 106-1 as identified by the request message 130-1 itself. Based on the forwarded request message 130-2, the origin server 106-1 can then send a response message 132-1, such as an HTTP response for receipt by the INE 104. The response message 132-1 will typically contain at least a portion of the requested content 128, such as metadata comprising information about the requested content 128.

The INE 104 determines that the content of the response is an MP4 file based on a MIME type HTTP header in the response message 132-1. The INE 104 can determine that the file is to be progressively downloaded to the UE 102 based on a determination of a "moov" box being placed before the "mdat" box in the MP4 file.

After receiving the response message 132-1, the INE 104 can then make a decision whether or not to optimise the retrieved content in the response message 132-1 and forward it onto the UE 102. For example, the INE 104 may determine that no optimisation is required and can therefore route the received content from the origin server 106-1 to the UE 102 without any modification. As such, the INE 104 comprises an optimisation module 134 that is capable of optimising the content 128 received in the response message 132-1 and forwarding the optimised content in a modified response message 136. The optimising process performed by the optimiser module 134 is described in more detail with reference to FIG. 7. The functions of the optimiser module 134 may alternatively be provided by a video optimisation server (VOS) that is separate from the INE 104. As such, the VOS is capable of communicating with the INE 104 so as to receive the original content, dynamically optimise the content (i.e. reduce the number of bytes of the content) and return the optimised content to the INE 104 for packaging as an HTTP response message 136 for sending to the UE 102.

Figure 4:
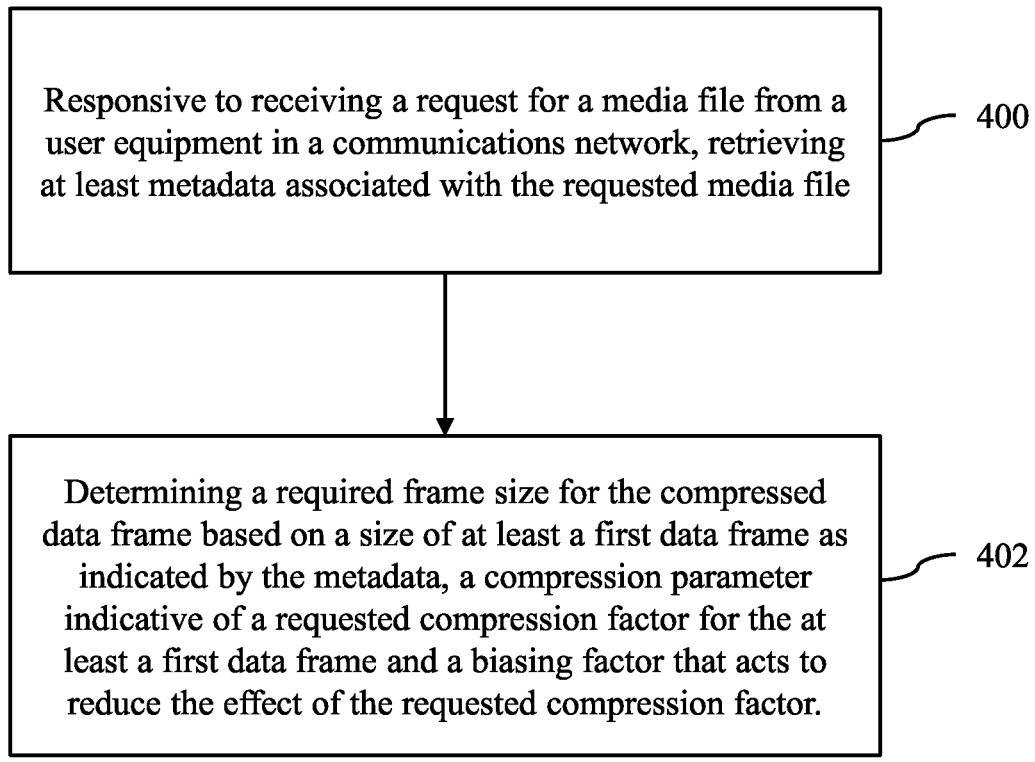
FIG. 4 is a schematic state flow diagram showing processes that occur in a first example of a method.

FIG. 4 shows a schematic state flow diagram of processes that occur in a first example of a method. The method is used for obtaining a required frame size for a first compressed data frame to be generated by compressing at least a first data frame of a media file, the first compressed data frame for use by a user equipment in a communications network.

At step 400, an intermediate network element 104, such as a proxy server, receives or intercepts a request 130-1 for a media file 128 from a UE 102. Responsive to the request 130-1, the INE 104 retrieves at least metadata 132-1 associated with the requested media file. For example, the metadata 132-1 may be retrieved from an origin server 106 that stores the media file 120. Alternatively, the metadata 132-1 may be retrieved from a memory 120 of the INE 104.

The INE 104 then, at step 402, determines the required frame size for the first compressed data frame. This is done based on a size of the at least a first data frame as indicated by the metadata 132-1, a compression parameter indicative of a requested compression factor for the first data frame and a biasing factor that acts to reduce the effect of the requested compression factor.

For example, the compression parameter may be predefined or may be associated with characteristics of the UE 102, such as display resolution, display size, UE processing capability and so forth, or be associated with network characteristics such as congestion, bandwidth, etc. Therefore, the metadata 132-1 will identify at least a first frame size associated with the first data frame that is to be compressed, and processes the first frame size using the optimisation parameter to produce a target frame size. The biasing factor is applied to the generated target frame size so as to increase the desired frame size for which content is to be compressed. The application of the biasing and the process of FIG. 4 is described in further detail with reference to FIG. 6.

Figure 5:
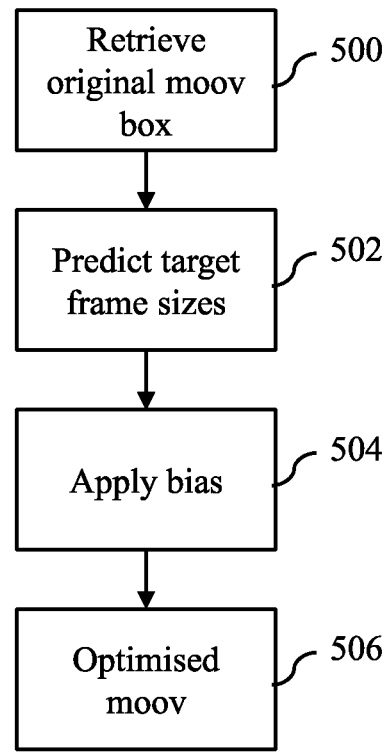
FIG. 5 is a schematic block diagram showing a process for generating an optimised moov box in a second example of a method.

FIG. 5 is a schematic block diagram showing the generation of an optimised moov box at the INE 104. At step 500, the INE 104 retrieves metadata from an origin server 106. For example, in the case which a user makes a HTTP request 130-1 to view MP4 content, the INE 104 contacts an origin server 106 (i.e. the origin server 106 that is identified by the HTTP request 130-1), so as to retrieve at least the moov box associated with the MP4. As the moov box is contained within the MP4, the moov box may be retrieved as a part of MP4 data that is delivered to the INE 104 from the origin server 106. Therefore, media data may also be sent across to the INE 104 along with the moov box. Whatever the case, the moov box is extracted from the HTTP response 132-1 that is received by the INE 104 from the origin server 106. Here, the moov box is termed an "original" moov box as it is associated with the MP4 content that has not been altered.

At step 502, the INE 104 extracts information from the original moov box and determines information regarding the frames of the MP4 file. In particular, the INE 104 determines at least the various frame sizes of each frame identified in the original moov file. The INE 104 uses this information to predict the target sizes of the frames when optimised in accordance with one or more specified optimisation or compression parameters. The optimisation parameters are determined by a policy control such as may be defined by an operator of the INE 104 or by a PCRF. In particular, there may be specific optimisation parameters according to variable factors such as make and model of the UE 102, display size and resolution, processing capability, network conditions and so forth. For example, the optimisation parameters may determine that every frame should be reduced in size by a certain factor, for example, twenty five percent. As set out above, optimising frame sizes in this manner could produce frames having target sizes that are smaller than a size that can be handled by an encoder and as such will force the encoder to truncate its output frames to match these target frames. This may be the case particularly for P-frames and B-frames as these frames are already quite small in size (i.e. compared with key frames or I-frames) before any optimisation has taken place. In order to reduce the likelihood of frames having to be truncated by the encoder, a bias is applied to increase the target frame size values by a predetermined factor. The biasing operation is further described with reference to FIG. 6. Steps 502 and 504 are repeated for every identified frame in the original moov box.

After having "upwards biased" the target frame sizes, the operation then moves on to step 506, at which point the biased target frame sizes are used to compile an optimised moov box. Therefore, a moov box is generated for an optimised MP4 without necessarily having to optimise all or any of the frames of the original MP4. The issue of having to first fully encode/transcode an MP4 in order to accordingly generate the moov box is thereby circumvented due to having effectively predicted the sizes of the encoded or compressed frames before they have actually been encoded or compressed. The optimised moov box can be used by the INE 104 during the encoding processes described with reference to FIG. 4 and FIG. 6. The optimised moov box can also be sent to the UE 102 to enable the UE 102 to execute a playback of the content that it has requested.

Figure 6:
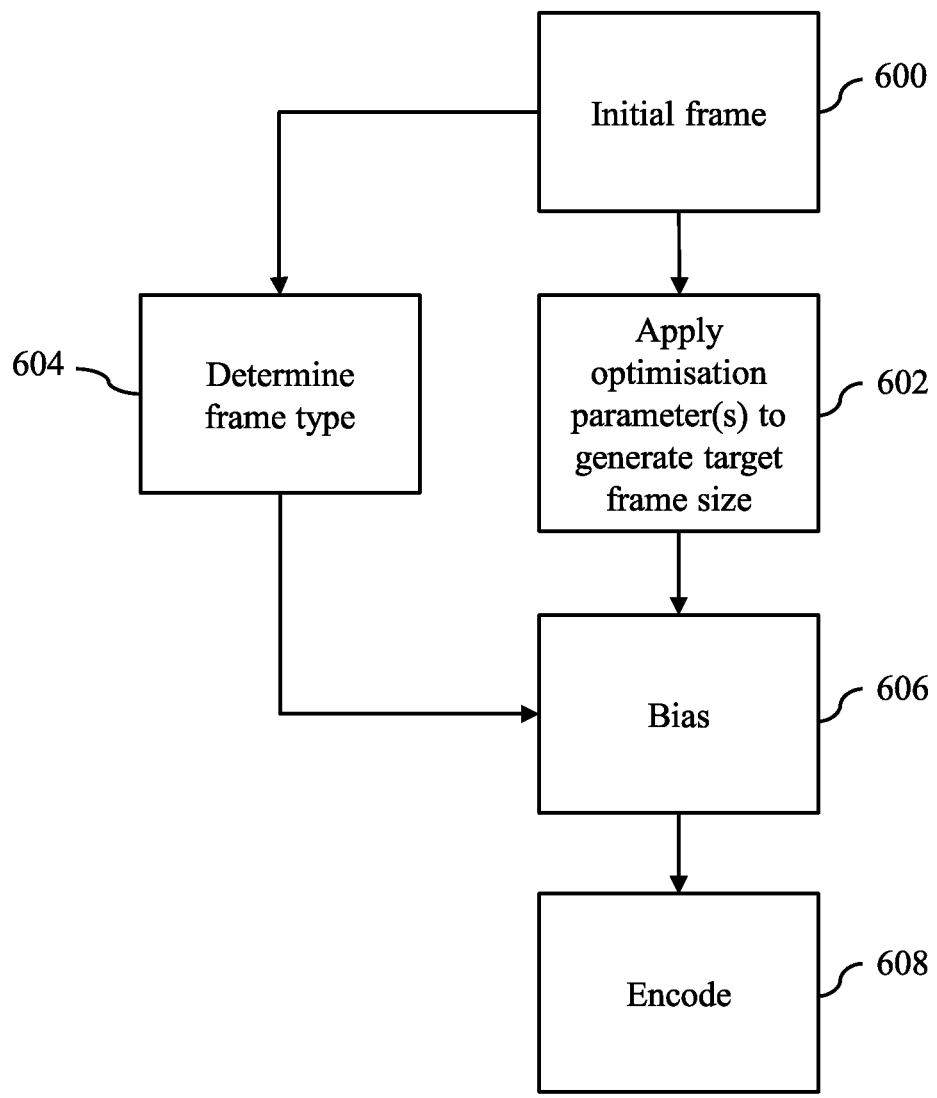
FIG. 6 is a schematic block diagram showing a compression process that occurs in a third example of a method.

FIG. 6 is a schematic block diagram showing an example of the encoding process described with reference to FIG. 4 in more detail. At step 600, an initial frame is selected for encoding. The encoding is done in a manner so as to reduce the number of bytes of the initial frame of data so as to fit within a required frame size determined by the encoding process. The initial frame will be the first frame in a sequence of the MP4 file if no frames have already been encoded for sending to the user. Otherwise, if one or more frames have already been encoded, the initial frame is the next frame in the sequence that requires encoding. In some cases, the initial frame is selected to be a frame corresponding to a seek request, as discussed in more detail with reference to FIGS. 8 to 14.

The frame size of the initial frame is determined based on the original moov box and one or more optimisation or compression parameters are applied to the initial frame size so as to generate a target frame size for that initial frame. For example, as described with reference to FIG. 5, the optimisation parameters may determine that every frame should be reduced in size by a factor of twenty five percent. Therefore, the target frame size is calculated as shown in equation (i):

$$T = INI \times (1-F) \qquad (i)$$

Where T is the target frame size, INI is the initial frame size and F is the reduction/optimisation factor as a percentage in decimal form (i.e. which in this example is twenty five percent and therefore takes a value of 0.25).

As well as determining the size of the initial frame, the frame type is also determined. This is done at step 604 where the initial frame is identified in the original moov box and the type is determined. For example, the frame type can be identified as being one of a key frame or I-frame, a IDR frame, a P-frame and a B-frame.

At step 606, a bias is applied to the target frame size so as to increase the size of the desired frame size. In this example, the bias is based on the determined frame type at step 604. More particularly, the bias is based on an average frame size for the determined frame type. Therefore, the target frame size may be biased towards the average frame size for that frame size type. The average frame size per type of frame is determined by a summation of all of the frame sizes of the same type within a content file and then by dividing the resultant value by the number of frames of the same type. The average frame size may be calculated using equation (ii):

$$AVGFR = (FR1 + FR2 + \ldots + FRn)/nFR \qquad (ii)$$

Where AVGFR is the average value of frame type "FR" (e.g. I-frame, P-frame, B-frame, etc.) in the MP4 and nFR is the total number of frames of the type FR identified in the moov box. The average value is calculated for each frame and cached for use in the application of the bias at step 606.

The bias is applied using the AVGFR so as to produce an optimised frame, OPTFR as shown in equation (iii):

$$OPTFR = ((m \times AVGFR) + T)/(m+1) \qquad (iii)$$

Where m is a selected integer equal or bigger than 1. For example, if m is given a value of 2, then equation (iii) would become equation (iv):

$$OPTFR = (AVGFR + AVGFR + T)/3 \qquad (iv)$$

The process then moves onto step 608 whereby the biased target frame size (i.e. the optimised frame size) is used in the encoding of content. The biased target frame size effectively ensures that the encoder allocates the specified number of bytes for each video frame that is to be optimised.

Therefore, taking the numerical example discussed above, a bias correction could, for example, change the overall reduction from 25% to 15%, therefore providing an optimised frame size of 850 bytes, which then would not require any truncation (assuming that this frame size is one which the encoder can handle).

Figure 7:
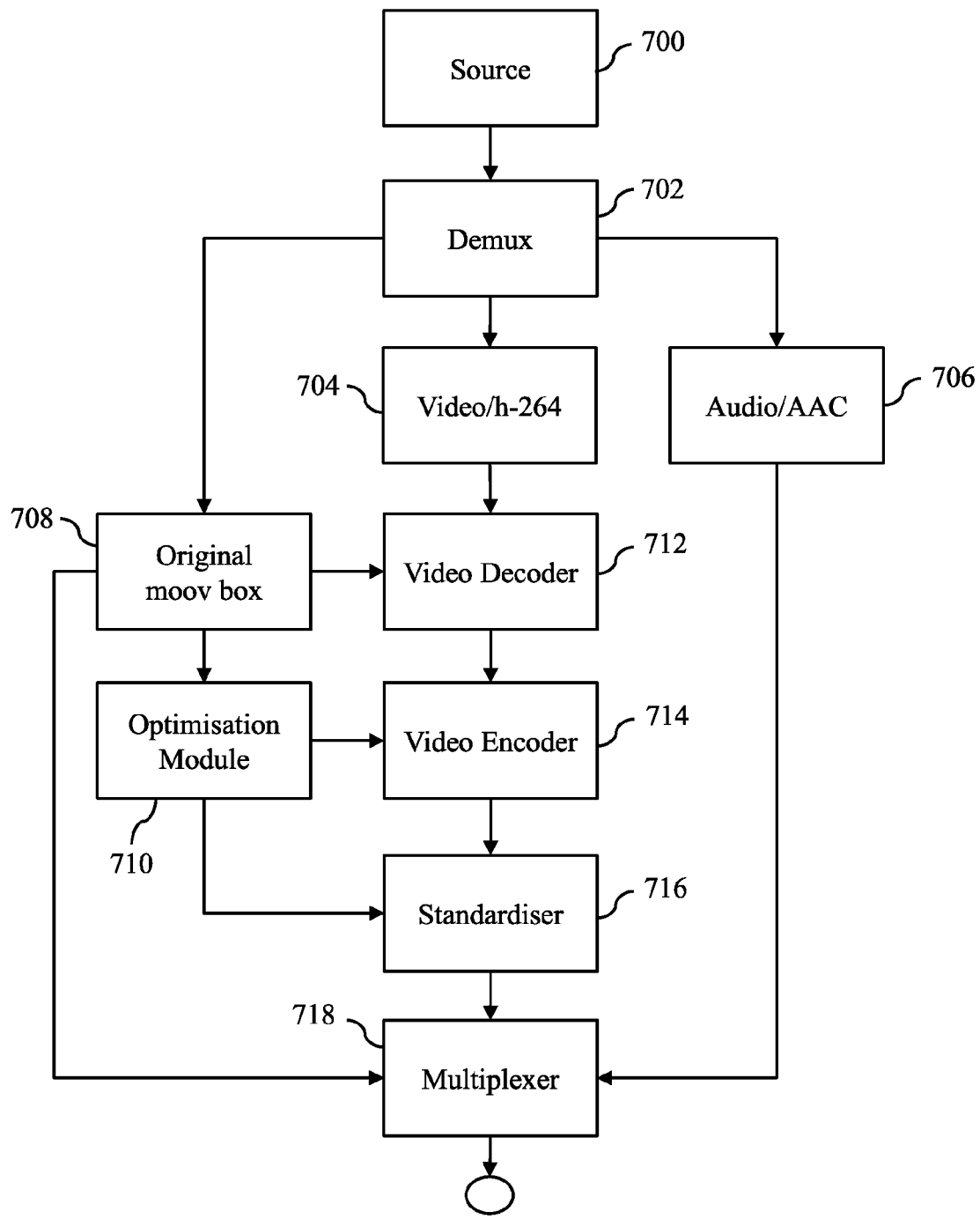
FIG. 7 is a schematic block diagram showing a process for compressing content in a fourth example of a method.

FIG. 7 is a schematic block diagram showing an example optimisation system. When the INE 104 receives a HTTP response 132-1 from the origin server 106-1 (labelled 700 as "source" in FIG. 7), the INE 104 parses the HTTP response 132-1 and passes the data onto a demultiplexer 702.

The demultiplexer 702 separates the MP4 data (i.e. an MP4 chunk) into its constituent video and audio components, as represented respectively by blocks 704 and 706. If the HTTP response 132-1 is the first HTTP response 132-1 for the particular HTTP request 130-1, then the moov box is also identified during the dumultiplexing operation as represented by block 708. If the HTTP response 132-1 is not the first HTTP response 132-1 for the particular HTTP request 130-1, then it is assumed that the moov box relating to the requested content has already been cached. Therefore, the INE 104 can perform a check in a database to see whether or not the relevant moov box has been cached.

The moov box is used by an optimisation module 710 for carrying out the optimisation process discussed above with reference to FIGS. 5 and 6 so as to generate an optimised moov and also to generate an optimised frame for use in the encoding process. Additionally, the optimisation module 710 identifies how (i.e. in what order) the video samples and the audio samples are interleaved in the mdat box.

A video decoder 712 decodes the video to its raw YUV buffer format, which defines a "colour space" of the video in terms of a luma (Y) component and two chrominance (UV) components. This is done so that the video can then be encoded to an optimised form compared with the originally received MP4.

Accordingly, the raw YUV components are encoded to an MP4 format using a video encoder 714. The video encoder encodes the raw YUV data using the optimised frames determined by the optimisation module 710.

A standardiser component 716 is used to ensure that the output encoded frames from the video encoder 714 are as close as possible in size to the optimised frames as determined by the optimisation module 710. Therefore, if an encoded frame is larger than that determined by the optimisation module 710, then the encoded frame is truncated so as to match (as close as possible) the determined optimised frame size. If the encoded frame size is smaller than the determined optimised frame size (i.e. and therefore "under runs") then the standardiser adds filler data or padding data so as to "pad out" the frame to match the optimised frame size. The filler data is effectively an extra number of bytes that takes up the remaining space in the frame. A multiplexer 718 receives the standardised frame and also receives the audio samples from block 707 (which have not been optimised) and multiplexes this data together. The multiplexer 718 interleaves the optimised video frames and audio samples in accordance with an arrangement or sequence dictated by the interleaving pattern identified by the optimisation module 710. This multiplexing occurs so as to interleave the binary video and audio data into an MP4 chunk. The multiplexed data is then arranged for sending to the UE 102 in a progressive download or streaming-type manner.

In the above examples, in addition to maintaining the same number of video frames and audio samples after optimising has occurred as the number in the original MP4 file, the type of frame is also maintained. This is to ensure that synchronisation points are maintained in the optimised moov box, enabling a media player to seek to the same frame in the optimised MP4 file as the frame in the original MP4 file. This is discussed in more detail with reference to FIGS. 8 to 14.

The above examples are to be understood as illustrative examples only. Further examples are envisaged. For example, in the above example described with reference to FIG. 5, the moov box was retrieved from the origin server 106. In alternative or additional examples, the INE 104 may store a plurality of moov boxes in memory 120. Therefore, a look-up can be performed in the memory 120 prior to determining whether or not the INE 104 already contains the desired moov box. As such, the INE 104 need not make any separate request for a moov box.

In the above examples, the biasing operation is performed for every video frame identified in the original moov box. In alternative examples, the biasing operation selectively occurs based on the determined frame type. For example, the biasing operation may occur only for identified P-frames and/or B-frames. In another alternative example, the biasing operation is selective based on a pre-determined threshold parameter of the video encoder 714. For example, if it is determined that a target frame size is smaller than the pre-determined threshold parameter, then the biasing operation is activated for that target frame size in order to produce the optimised frame size. If it is determined that a target frame size is equal to or larger than the pre-determined threshold parameter, then the biasing operation is deactivated and does not affect the determination of the optimised frame size.

In the above examples, the audio samples multiplexed with their associated video frames were not optimised. This is because such optimised audio may typically have a more easily recognisable quality degradation compared with optimised video. However, in alternative examples, the audio samples may also be optimised before being multiplexed with the video frames. This optimisation of the audio samples may occur in a like manner to the optimisation of the video frames discussed herein.

In the above examples described with reference to FIG. 7, the multiplexing of the video frames and audio samples is done according to the order in which the data is arranged in the original MP4 file. In alternative examples, a different layout may be provided, ensuring that the audio samples and video frames are no more than 0.5 to 1 second apart.

It will be appreciated that other methods of "dynamically" optimising or encoding, including compressing, transcoding or transrating content for streaming or progressive download, may be possible. As discussed above, in the cases of container formats such as MP4 and the like, metadata (i.e. moov box) concerning the container format must be known prior to receiving any data in order to execute playback of the MP4. In general, when a content provider sends media content to a user, the media content is encoded in such a way so as to allow the metadata to be easily accessed for this purpose. For example, the moov box can be placed near the beginning of a media file so that the user can access the moov box and determine how the playback of the MP4 can be executed. In the case of MP4 files, a determination that the moov box precedes the mdat box may be indicative that the MP4 file is for progressively downloading to the UE 102.

As described above, the optimised moov box is generated so as to maintain frame types, sequence ordering and other such information in order that a user seek operation can be successfully performed. The user seek operation will now be described in more detail.

Figure 8:
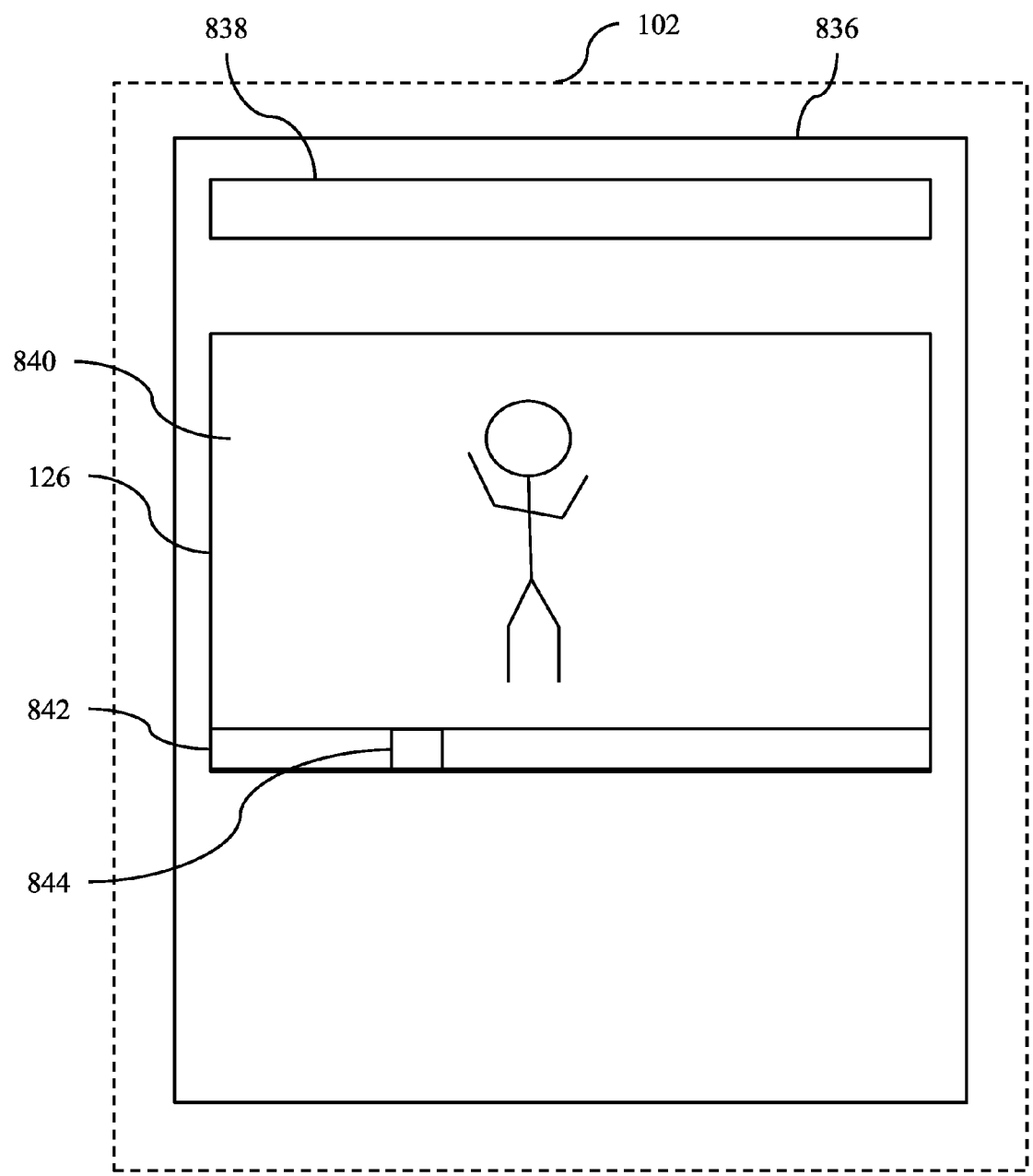
FIG. 8 is a schematic block diagram of an example of a web page.

FIG. 8 is a schematic diagram showing an example of a media player application 126 running in a web browser 836, as discussed with reference to FIG. 3. The web browser 836 is generally a software application that can be used to access data over the internet. The accessed data can typically be displayed via the web browser 836 in the form of an HTML web page having a plurality of content elements.

In this example, the media player application 126 is a JavaScript application that is embedded in the web page and executed by the web browser 836. The media player application 126 is used to execute streaming, progressively downloaded content, or the like, for playback to a user. As described with reference to FIG. 3, a user of the UE 102 can enter a URL in an input field 838 of the web browser in order to load data from a particular server. The web page may contain embedded URLs, which can be selected by the user in order to initiate a streaming or download of content 128, such as an MP4 file. The selection of the content 128 may additionally or alternatively be provided via other means such as selection icons or links embedded in the media player application 126 or any other application.

The media player application 126 can be loaded and executed by the user directly or can be loaded responsive to a user selection of a particular URL embedded in a web page that indicates an address for streaming or downloading desired content 128. The media player application 126 has a display area 840, a seek bar 842 and a selector icon 844. The display area 840 allows the video stream to be displayed to the user upon execution. Associated audio with the video stream can be output via speakers (not shown) of the UE 102. The seek bar 842 in combination with the selector icon 844 provides a user interface that allows the user to observe the point at which they are currently viewing a playback of a video. This user interface also allows the user to control the point at which they would like to view the playback of the video. This control is done by allowing the user to move the selector icon 844 along the seek bar 842.

The scrolling of the selector icon 844 thereby provides a method for allowing the user to navigate or "seek" through the video. The seeking operation enables range requests to be generated indicative of a specified range of data values requested to be retrieved for playback. In general, the range requests may be divided into "seeking range requests" and "non-seeking range requests". A seeking range request is one in which the media player application 126 enables the user to browse through video key frames only. A non-seeking range request is when the user is allowed to browse to an arbitrary point along the seek bar 842 that is at a random offset from a key frame. Therefore, when a user indicates that they would like to view a point in the media stream that is offset from the beginning of the media stream by moving the selector icon 844 along the seek bar 842, a range request can be generated for sending to the INE 104. This has the effect of enabling the UE 102 to request a specified portion of content (i.e. a chunk) for playback.

Figure 9:
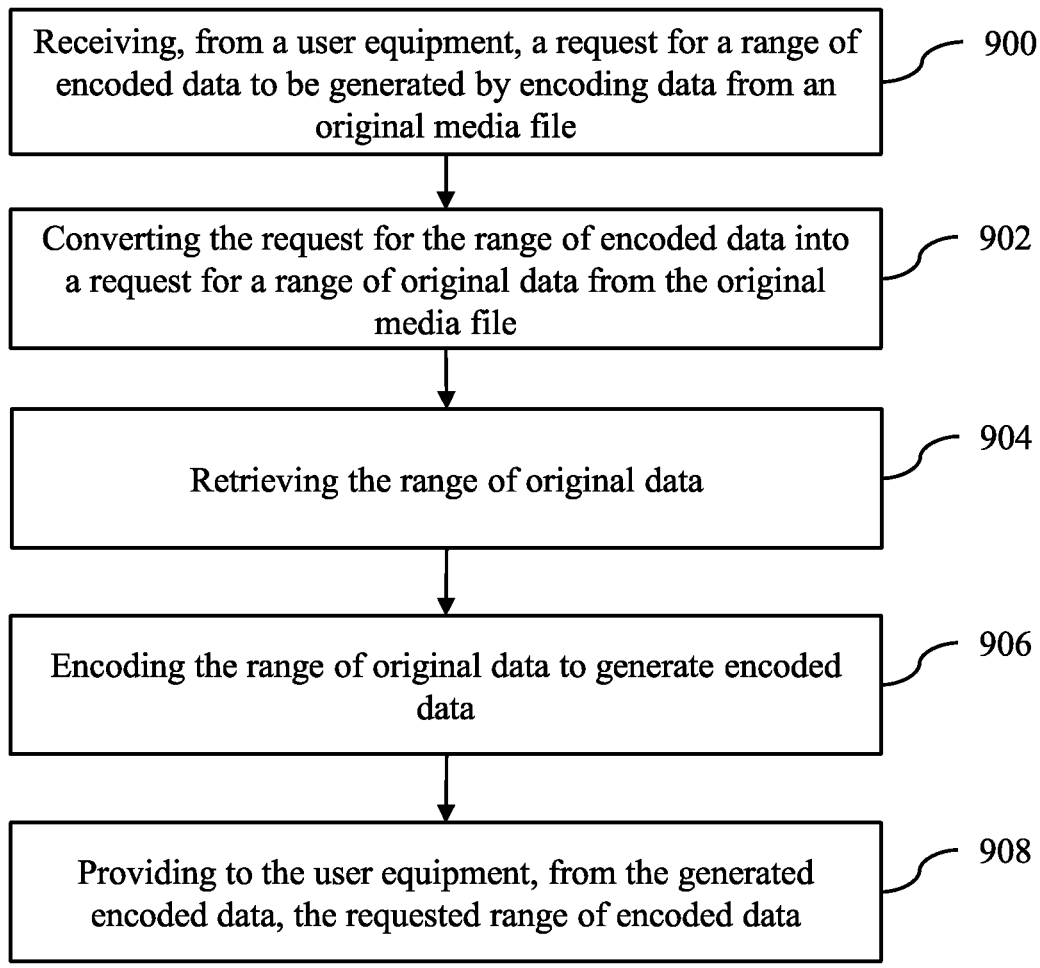
FIG. 9 is a schematic state flow diagram showing processes that occur in a fifth example of a method.

FIG. 9 is a schematic block diagram showing some of the steps performed by a INE 104 in response to receiving a range request from a UE 102. In this non limiting example, the UE 102 is assumed to have already initiated a progressive download of content prior to a user's seek operation. As such, the metadata (in the form of an optimised index or optimised moov box) corresponding to optimised content (or more particularly, the content to be optimised) is already known and cached at the UE 102 and is also known and cached at the INE 104. For example, the optimised moov box may have been generated as described above with reference to FIG. 5. It will be appreciated however that various forms of optimised index are possible, and that the seeking operation described herein may therefore be applicable to any content that has been optimised, compressed, transcoded, transrated or encoded, regardless of whether or not the content has been optimised in the manner described herein.

The INE 104 generates a mapping between the original moov box and the generated optimised moov box. For example, the frame sizes and offsets (from the beginning of the file) of each optimised frame are mapped to the corresponding frame sizes and offsets of each original frame from which the optimised frame was derived. This mapping could for example be provided as a list or table that is stored at the INE 104. In this example, the same number of video frames and audio samples are maintained in the optimised file as in the original file. The frame type is also maintained. An example of a format of the mapping is provided in table 1.

TABLE 1

Example of mapping between original and optimised key frame offsets

| Index | Optimised key frame offset | Original key frame offset |
|-------|---------------------------|---------------------------|
| 1     | 0                         | 0                         |
| 2     | 1000                      | 1500                      |
| 3     | 2000                      | 2900                      |
| 4     | 3000                      | 4000                      |
| 5     | 4000                      | 4890                      |
| 6     | 5000                      | 6902                      |

At step 900, the INE 104 receives a request for a range of encoded data from the UE 102. This range of encoded data is data that is to be generated by encoding data from an original media file. The request may be in the form of a byte range request. Therefore, the request is generated and sent by the UE 102 responsive to a seek operation performed by the user. The request is for a specified range of first data values associated with a first content index (i.e. the optimised moov box or other such optimised metadata file), whereby the first content index is for execution by the media player application 126 for playback of content. The first content index is based on a second content index (i.e. the original moov box or some other non-optimised metadata file) and an optimisation parameter. Therefore, the first content index may be representative of an optimised content file, such as an encoded MP4.

In more detail, the offset or seek point selected by the user (i.e. by moving the selector icon 844 to a desired position in the seek bar 842) is translated into a range of first data values by the UE 102. This is done by performing a look up using the first content index to find the range of data values that is associated with the seek point. For example, the seek point may be a time during playback of the content and the first content index may provide a mapping between playback time values and corresponding bytes of data. The range request comprises an indication of a starting offset and a requested number of bytes in the format "offset-bytes". For example, the range request may ask for a range "1000-32000". The range request may therefore begin from a byte offset of 1000 that has been determined to correspond with the seek point time. The range request may end at a byte offset of 32000. In this example therefore, the range request asks for 31000 bytes of data to be retrieved for playback at the UE 102 starting from the byte offset of 1000. If the range begins from a determined byte that is not at a key frame offset (i.e. a non-seeking request), the starting point is shifted to the nearest key frame offset that precedes the determined byte.

Using the range of first data values, the INE 104 can identify a range of second data values from the second content index. For example, this can be done using the mapping of the first content index with the second content index.

Therefore, at step 902, the INE 104 converts the request for the range of encoded data into a request for a range of original data from the original media file. At step 904, the range of original data is then retrieved.

At step 906, the INE 104 encodes the range of original data in order to generate the encoded data. For example, the encoding may occur as with the process described with reference to FIG. 7.

At step 908, the INE 104 provides the requested range of encoded data, from the generated encoded data, to the UE 102 to enable playback of the requested content to the user.

Figure 10:
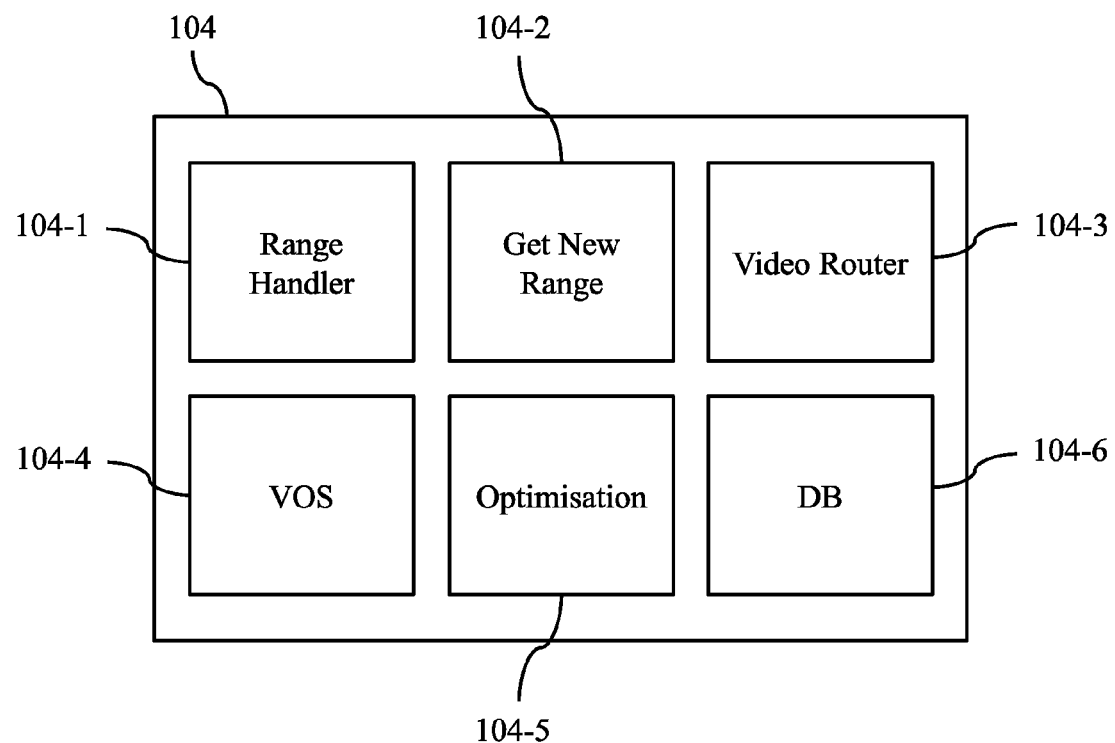
FIG. 10 is a schematic block diagram showing a network element present in the communications network of FIG. 1 in further detail.

FIG. 10 is a schematic block diagram showing an example of an INE 104 for use in the signalling processes described with reference to FIGS. 11 and 12. The INE 104, in this example, comprises one or more of the following modules, which may be involved in the signalling process: a range handler module 104-1, a get new range module 104-2, a video router 104-3, a video optimisation server (VOS) 104-4, an optimisation module 104-5 and a database (DB) 104-6. Some of these modules may alternatively be external to the INE 104 rather than integrated with the INE 104. For example, the VOS 104-4 may be provided as a device that is separate from the INE 104.

Figure 11:
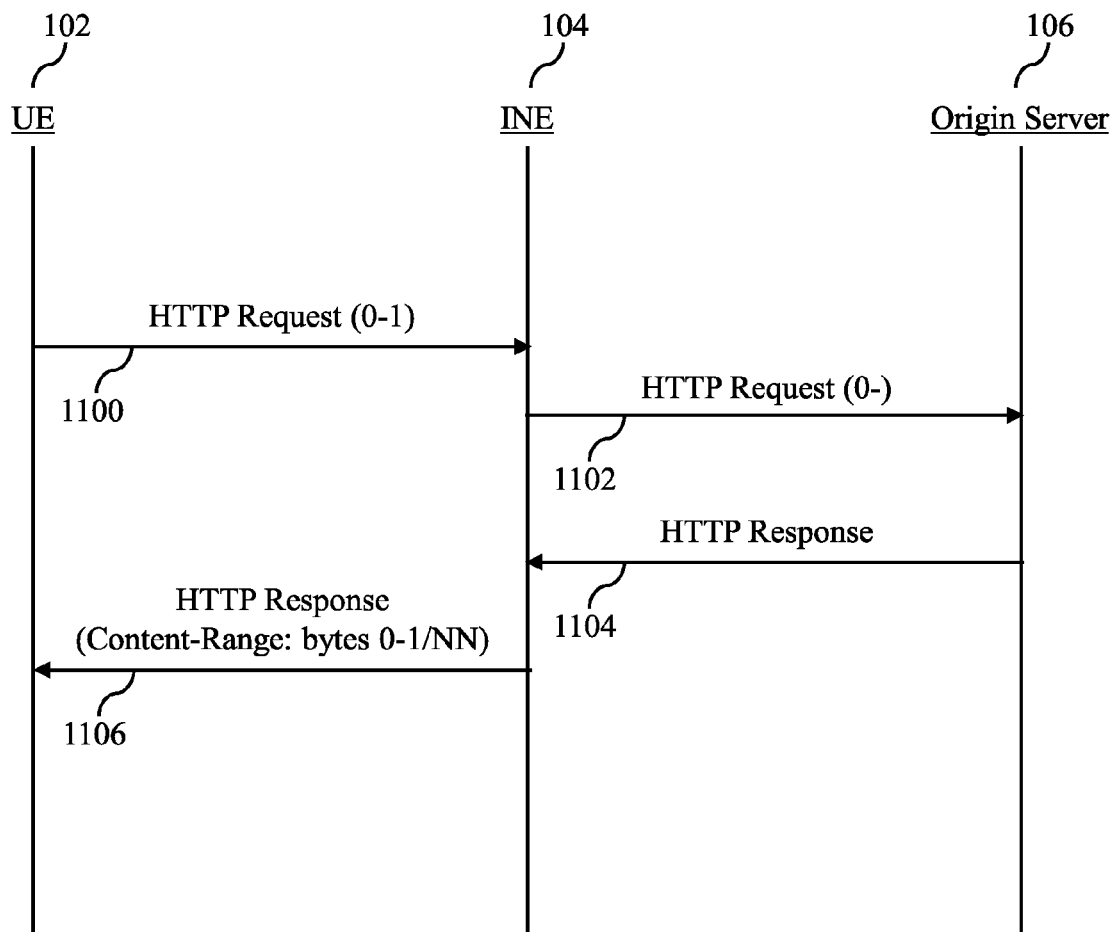
FIG. 11 is a signalling diagram showing the processes that occur when handling content in the communications network in a sixth example of a method.
Figure 12:
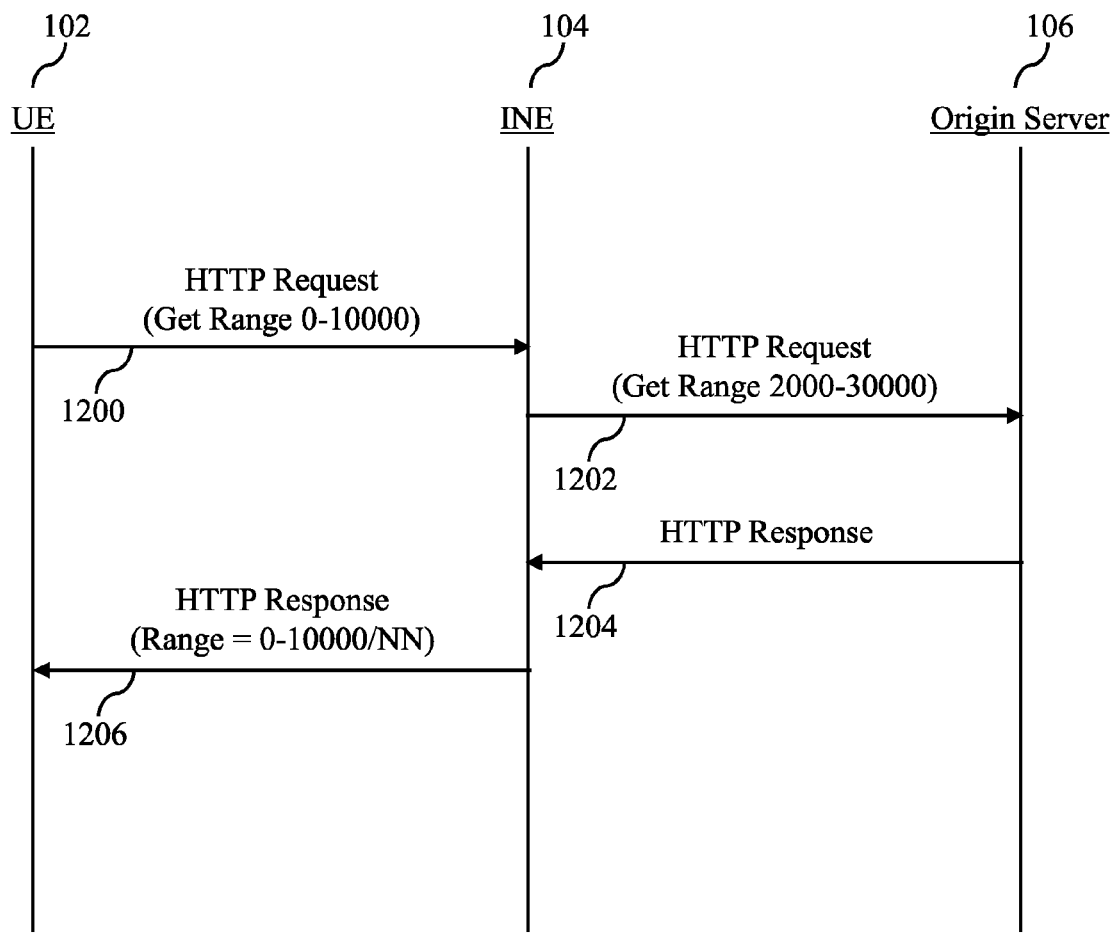
FIG. 12 is a signalling diagram showing the processes that occur when handling content in the communications network in a seventh example of a method.

FIGS. 11 and 12 are signalling diagrams showing further examples of processes that occur when a seek operation is performed by a user. In particular, these signalling diagrams show the signalling between the UE 102, the INE 104 and the origin server 106.

The above example described with reference to FIG. 9 assumes that the optimised index is known at the UE 102 prior to a seek operation being performed by the user. FIG. 11 is a schematic signalling diagram showing the processes that occur when the optimised index is not known at the UE 102. FIG. 12 is a signalling diagram showing in detail the processes that occur once the optimised index is known at the UE 102 and a seeking operation is performed.

In FIG. 11, the UE 102 initiates a range request without having previously received the requested content from the INE 104. As such, when making a first attempt to access content from the origin server 106, the UE 102 must first determine the total size of the content (i.e. media file) that it is requesting. This is because, in order to progressively download the content, the UE 102 must make appropriate HTTP requests (such as "get" requests) for the portions of content and therefore needs to pre-emptively determine sizes of the portions requested in each HTTP request. More particularly, each HTTP request is used to download a chunk of the MP4 payload using a HTTP byte range. The UE 102 will continuously make HTTP range requests until all of the content is consumed or until the progressive download is otherwise terminated. The chunk size is non-deterministic and the UE 102 makes decisions about the requested chunk size based on the resources available to the UE 102 (i.e. such as memory and processing capability) at the time of making the request.

At step 1100, the UE 102 sends an initial byte range request for content to the origin server 106, which is intercepted by the INE 104. In this example, the initial byte range request is for the first two bytes from a zero offset position in the requested media file. The initial byte range request is therefore given a range header of "0-1". The range handler module 104-1 of the INE 104 communicates with the get new range module 104-2 to determine whether or not the received request is the first request of this type received from the UE 102. The determination is done by checking the DB 104-6 to see if any optimised moov box exists for the requested media file. If it is determined that the received request has been seen before by the INE 104 and that the optimised moov box already exists in the DB 104-6, then the optimised moov box for the request media file is returned to the UE 102. For each MP4 file for which a request has previously been received and for which moov boxes have already been optimised, the DB 104-6 caches everything from the start of the MP4 file up to and including the fourCCstring of the mdat box. This typically includes the FTYP box, the original moov box and the fourCCstring. The optimised moov box for that MP4 file is also cached. Typically, each URL that addresses an MP4 file is normalised so that requests for the same file over different Content Delivery Networks (CDNs) are treated the same.

If the received request has not been seen before, then the range handler module 104 determines that the requested media file requires an optimised moov box to be generated. As such, the range handler module 104-1 rewrites the range header of the initial byte range request from "0-1" to "0-" so that it is unbounded. The unbounded header is indicative that the complete media file should be requested from the origin server 106, as opposed to only a portion of the media file. Requesting the complete media file allows the corresponding moov box for that file to be captured by the INE 104.

At step 1102, the modified initial byte range request is sent to the origin server 106 in order to begin retrieval of the media file, including the original moov box. In response, the origin server 106 returns content to the INE 104 (step 1104).

Video router module 104-3 routes the content to VOS 104-4 for optimisation. In particular, the optimisation module 104-5 associated with the VOS 104-4 receives the original moov box and stores it in DB 104-6. The VOS 104-4 also creates an optimised moov box based on the original moov box and stores the optimised moov box in the DB 104-6. The persisting of the optimised moov box and the original moov box in the DB 104-6 is done in a manner so as to include all of the bytes from the start of the MP4 file up to and including the start of the mdat box, including the fourCC (four character code) string (i.e. a sequence of four bytes used to uniquely identify data formats) and box size. The DB 104-6 therefore caches the FTYP box, the moov boxes (i.e. both the original moov box and the optimised moov box) and the fourCC string of the mdat box for every media file for which an optimised moov box is required. Thereafter, the INE 104 generates and caches a mapping of the optimised key frame offsets (i.e. offset from the beginning of the playback file) to the original key frame offsets. The generated mapping data is known as "frameinfo" data.

At step 1106, an initial response is then returned to the UE 102 from the INE 104 so as to provide the UE 102 with the size (i.e. that has been predicted) of the optimised media file. The response is sent to the UE 102 as an HTTP response comprising a "Content-Range" header that includes the optimised media file length "Content-Range: bytes 0-1/NN", where "NN" is the size of the optimised media file. Thereafter, the UE 102 may generate HTTP requests based on the optimised media file length information.

FIG. 12 shows the signalling processes that occur for requesting data once the optimised moov box is known at the UE 102. For example, these signalling processes may follow the signalling processes described with reference to FIG. 11. The signalling processes are used to retrieve the "next" chunk of data from the origin server 106.

At step 1200, the UE 102 generates and sends a request for the next chunk of data from the origin server 106. The next chunk of data is that which follows the previous chunk of data requested by the UE 102. In this example, the chunk of requested data has a byte range of 0-10000 bytes (i.e.

"start at offset 0; end at offset 10000"). As described above with reference to FIG. 11, the request is intercepted by the INE 104 so that content can be retrieved and transcoded before then being returned to the UE 102.

As the request is made on the basis of the optimised moov box, and hence is a byte range request identifying optimised data values or bytes, the range must be rewritten so that it references the bytes in the original file that exists at the origin server 106. Therefore, range handler module 104-1 refers to the frameinfo data (i.e. the mapping between the optimised moov box and the original moov box) and determines the range of bytes identified in the original moov box that correspond with the requested range of bytes that are based on the optimised moov box. In this example, the original byte range corresponding with the optimised byte range is determined to be 2000-30000 bytes. As mentioned with reference to FIG. 11, a non-seeking range request is adjusted so that it starts from a key frame offset before identifying the corresponding bytes identified in the original moov box.

At step 1202, the modified request message with the identified original byte range is sent to the origin server 106 so as to retrieve the content corresponding to the original byte range. The original byte range is returned to the INE 104 from the origin server 106 in step 1204. This is then optimised by the VOS 104-4. The optimisation process involves prepending the original moov box to the retrieved original byte range in order to form a complete MP4 file for demuxing. The VOS 104-4 then demuxes, decodes, re-encodes and then multiplexes the data to form a chunk of content. Typically, a demuxer will start at the beginning of an MP4 file (i.e. at the "zero index") and will thus be aware of the first sample of audio or the first sample/frame of video, in terms of offset and size. The demuxer will read this frame and pass it to a video or audio decoder before then adjusting its pointers for reading the next frame. When there is a seeking operation, the data to be retrieved is not at a zero index and therefore the pointers of the demuxer must be adjusted to read the correct requested data.

The range handler module 104-1 ensures that any bytes that have not been requested by the UE 102 are removed from the chunk of content so that only those bytes that have been requested by the UE 102 are then received by the UE 102. This is done by comparing the chunk with the originally received range request and then discarding the bytes that are outside of the specified range.

Then, at step 1206, the response is sent to the UE 102 for playback.

Figure 13A:
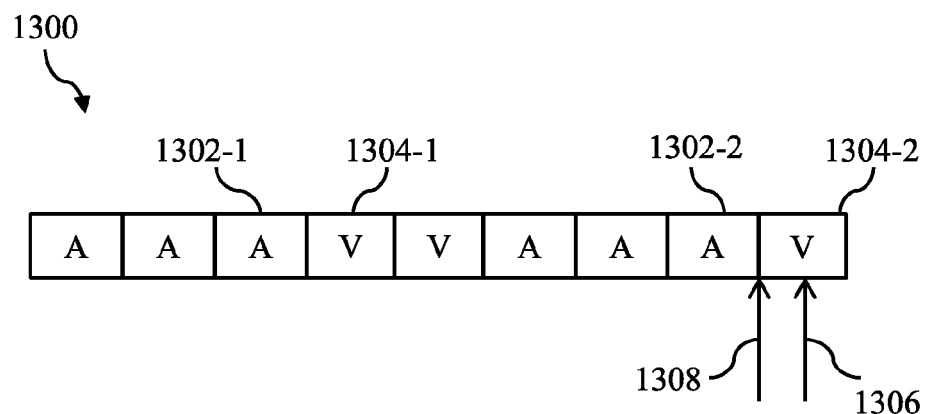
FIG. 13*a* is a schematic block diagram showing an example of an interleaving of audio samples and video frames.

FIG. 13a is a schematic block diagram representation of an example of an encoded MP4 chunk 1300, for example, which has been encoded as described with reference to FIG. 7. This figure shows how audio samples 1302 and video frames 1304 of the encoded MP4 chunk 1300 may be interleaved. In this example, a first audio sample 1302-1, a second audio sample 1302-2, a first video frame 1304-1 and a second video frame 1304-2 are provided. The first audio sample 1302-1 is followed by the first video frame 1304-1. The second audio sample 1304-2 is followed by the second video frame 1304-2.

Responsive to a user seek operation, a byte range request is generated and sent towards the origin server 106. As described with reference to FIG. 12, the byte range request is made on the basis of the optimised moov box (i.e. which is known at the UE 102) and hence can be called an "optimised byte range request". Such an optimised byte range request may initiate at a starting byte that is associated with any random point that could, for example, be in the middle of a video frame or audio sample, such as is shown by arrow 1306.

The optimised byte range request is intercepted by the INE 104 and the INE 104 then processes the optimised byte range request so as to return encoded data, as requested by the optimised byte range request, to the UE 102. However, as the encoded MP4 file has a different number of bytes compared with the corresponding original MP4 file, the INE 104 cannot directly map the requested bytes identified in the optimised byte range request to bytes identified in the original MP4 file. Therefore, the INE 104 modifies the optimised byte range request so that it begins at the earliest (i.e. closest) key frame offset that has been identified to precede the initial byte of the byte range request, which, in this case, is the key frame offset of the second video frame 1304-2. The INE 104 then generates an "original byte range request", based on the frameinfo table discussed with reference to FIG. 11 and the modified optimised byte range request. This is done by mapping the second key frame offset 1304-2 to the corresponding key frame offset of the original MP4 file (shown in FIG. 13b), as identified by the frameinfo table.

Figure 13B:
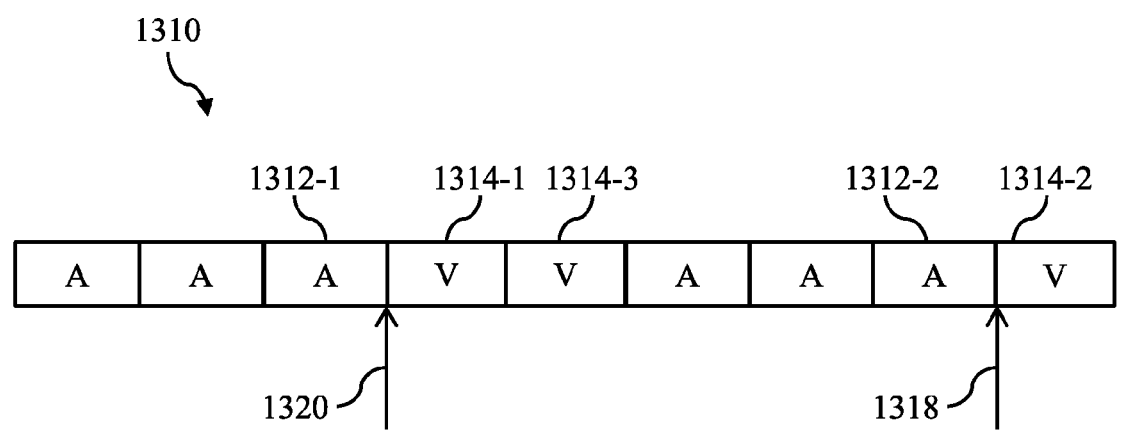
FIG. 13*b* is a schematic block diagram showing another example of an interleaving of audio samples and video frames.

FIG. 13b is a schematic block diagram representation of an example of an original MP4 chunk 1310 corresponding to the encoded MP4 chunk 1300 of FIG. 13a (i.e. the encoded MP4 chunk 1300 has been encoded based on the original MP4 chunk 1310). The audio samples 1312 and video frames 1314 of the original MP4 chunk 1310 are interleaved with the same order or pattern as the audio samples 1302 and the video frames 1304 of the encoded MP4 chunk 1300. Therefore the first audio sample 1302-1 of the encoded MP4 chunk 1300 maps to the first audio sample 1312-1 of the original MP4 chunk 1310; the second audio sample 1302-2 of the transcoded MP4 chunk 1300 maps to the second audio sample 1312-2 of the original MP4 chunk 1310; the first video frame 1304-1 of the transcoded MP4 chunk 1300 maps to the first video frame 1314-1 of the original MP4 chunk 1310; and the second video frame 1304-2 of the transcoded MP4 chunk 1300 maps to the second video frame 1314-2 of the original MP4 chunk 1310.

As shown by arrow 1318, the second video frame offset 1314-2 of the original MP4 chunk 1310 corresponding with the second video frame offset 1304-2 of the encoded MP4 chunk 1300 is selected by the INE 104 as being the relevant starting key frame offset associated with the optimised byte range request and the INE 104 uses this to generate an original byte range request.

Similar to the beginning point of the optimised byte range request, the end point of the optimised byte range request could be at a random point in the encoded MP4 chunk 1300. For example, in the above example where the range request is "1000-32000", the range is expected to end at byte offset of 32000, which may not be at a key frame offset. In one example, the INE 104 may modify the optimised byte range request so that its end point is at the earliest key frame that is after the byte identified by the optimised byte range request. The INE 104 can thereby convert the optimised byte range request into an original byte range request by identifying key frames in the original MP4 file that are associated with the transcoded key frames identified in the optimised byte range request. In another example, the INE 104 determines the appropriate number of bytes of the original MP4 chunk 1310 that, when optimised, would result in 31000 bytes (i.e. 32000-1000 bytes), and uses this number in the original byte range request regardless of whether or not it coincides with a key frame offset. For example, the INE 104 may determine that 45000 bytes, when optimised, would result in the requested 31000 bytes. Therefore, for example, the optimised range request 1000-32000 relating to the optimised MP4 may be mapped to an original range request of 1500-46500.

Thereafter, the INE 104 determines whether or not the audio sample or samples 1312 associated with the identified starting key frame 1314-2 precede that starting key frame 1314-2 in the interleaving sequence of the original MP4 chunk 1310 as identified by the trak boxes for the video and audio streams. As described in step 710 of FIG. 7, the INE 104 is aware of the interleaving pattern between video frames 1314 and audio samples 1312 and, as such, can readily identify the audio samples 1312 that are associated with the identified starting video key frame 1314-2. If the associated audio sample or samples are determined to precede the identified starting key frame 1314-2, then the INE 104 modifies the original byte range request so as to include the nearest key frame 1314 that precedes the associated audio sample(s) 1312. Advantageously, in this manner, the INE 104 can ensure that any audio that is associated with a byte range request will be included in the response message that is sent back to the UE 102. In this example, the associated audio sample with the second key frame 1314-2 has been determined to be the second audio sample 1312-2. In order to include the second audio sample 1312-2 in the original byte range request, the INE 104 identifies the earliest video key frame which precedes the second audio sample 1312-2, which in this case is the first video key frame 1314-1 (it is noted that another video frame 1314-3 follows the first video key frame 1314-1, however this video frame 1314-3 is not a key frame). The INE 104 then modifies the original byte range request so that it begins from the start of the first video key frame 1314-1 as identified by arrow 1320 (i.e. the beginning of the original byte range request is moved from point 1318 to point 1320). Therefore, the INE 104 can modify the byte range request so as to ensure that the relevant audio is included in the content that is retrieved from the origin server 106. Similarly, the end of the range request is analysed to see whether any associated audio samples with the frame in which the end point is present will fall outside of the range. If so, the range is expanded by shifting the end point so as to include the associated audio.

Although in the examples discussed above with respect to FIGS. 13a and 13b, the inclusion of audio samples determined to precede a key frame was discussed in the context of range requests, it will be appreciated that, in other examples, a range request is not required. Instead, for example, an identified byte corresponding to a user's seek point can be used, without specifying any range.

In the examples described with respect to FIGS. 13a and 13b, the non-seeking request 1306 was shown to be offset from a start of the first video key frame 1304-2. In other examples, the non-seeking range request may be offset from the start of a non-key frame, such as a P-frame, B-frame or an audio sample. In such cases, the nearest key frame preceding the non-seeking request is first identified for modifying the range request before then performing the step of identifying the associated audio sample.

In the examples discussed with reference to FIGS. 13a and 13b, the encoded MP4 file was shown to undergo a compression and therefore has a reduced number of bytes, however in other examples, the encoded MP4 may have experience an expansion thus having an increased number of bytes.

It is to be understood that any feature described in relation to any one embodiment may be used alone, or in combination with other features described, and may also be used in combination with one or more features of any other of the embodiments, or any combination of any other of the embodiments. Moreover, whilst many of the processes or structural components discussed herein are shown as separate modules, it will be appreciated that such modules may be combined together to form a single module. For example, FIG. 7 shows various module components such as a video decoder module, a video encoder module, a standardiser module, an optimisation module and a multiplexer module. It will be appreciated that the processes performed by these modules can be performed by one or more modules, such as one or processors. Furthermore, equivalents and modifications not described above may also be employed without departing from the scope of the invention, which is defined in the accompanying claims.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The invention claimed is:

1. A method for encoding data of a media file for playback by a user equipment in a communications network, the method comprising:

receiving, from the user equipment, a request for a range of encoded data to be generated by encoding data from an original media file, wherein the original media file comprises video frames interleaved with audio samples associated with the video frames;

generating video key frame offset mapping data that maps offsets of video key frames in the original media file to offsets of corresponding encoded video key frames in an encoded media file to be generated by encoding the original media file;

converting, using the video key frame offset mapping data, the request for a range of encoded data into a request for a range of original data from the original media file, wherein the converting comprises: identifying a first video key frame of the range of original data required to provide to the user equipment, from the encoded data to be generated, the requested range of encoded data; identifying that at least one audio sample associated with the first video key frame precedes the first video key frame in the range of original data; identifying a further video key frame that precedes the first video key frame and the associated at least one audio sample in the range of original data; initiating the range of original data with the further video key frame; retrieving the range of original data; encoding the range of original data to generate encoded data; and providing to the user equipment, from the generated encoded data, the requested range of encoded data.

2. A method according to claim 1, the method further comprising:
retrieving first metadata that describes frames in the original media file;
generating second metadata that describes frames in the encoded media file to be generated by encoding the original media file; and
generating the video key frame offset mapping data using the first metadata and the second metadata.

3. A method according to claim 2, the method further comprising:
using the first metadata to generate the second metadata.

4. A method according to claim 1, wherein the method is implemented by a server located between the user equipment and an origin server that provides the original media file, the method comprising:
retrieving the range of original data from the origin server.

5. A method according to claim 1, wherein the request is a HTTP request and the requested range of encoded data is provided to the user equipment in a HTTP response.

6. Apparatus for encoding data of a media file for playback by a user equipment in a communications network, the apparatus comprising:
a processor executing computer program code stored in memory to cause the processor to:
receive, from the user equipment, a request for a range of encoded data to be generated by encoding data from an original media file, wherein the original media file comprises video frames interleaved with audio samples associated with the video frames;
generate video key frame offset mapping data that maps offsets of video key frames in the original media file to offsets of corresponding encoded video key frames in an encoded media file to be generated by encoding the original media file;
convert, using the video key frame offset mapping data, the request for a range of encoded data into a request for a range of original data from the original media file, wherein the converting comprises: identifying a first video key frame of the range of original data required to provide to the user equipment, from the encoded data to be generated, the requested range of encoded data; identifying that at least one audio sample associated with the first video key frame precedes the first video key frame in the range of original data; identifying a further video key frame that precedes the first video key frame and the associated at least one audio sample in the range of original data; initiating the range of original data with the further video key frame;
retrieve the range of original data;
encode the range of original data to generate encoded data; and
provide to the user equipment, from the generated encoded data, the requested range of encoded data.

7. Apparatus according to claim 6, further comprising:
retrieving first metadata that describes frames in the original media file;
generating second metadata that describes frames in the encoded media file to be generated by encoding the original media file; and
generating the key frame position data using the first metadata and the second metadata.

8. Apparatus according to claim 7, the method further comprising:
using the first metadata to generate the second metadata.

9. Apparatus according to claim 6, wherein the apparatus is implemented by a server located between the user equipment and an origin server that provides the original media file, comprising:
retrieving the range of original data from the origin server.

10. Apparatus according to claim 6, wherein the request is a HTTP request and the requested range of encoded data is provided to the user equipment in a HTTP response.

11. A non-transitory computer readable medium configured to store executable program instructions, which, when executed by an apparatus, cause the apparatus to perform the steps of:
receiving, from a user equipment, a request for a range of compressed data of a media file to be generated by compressing data from an original media file, wherein the range of compressed data is for playback by the user equipment, wherein the original media file comprises video frames interleaved with audio samples associated with the video frames;
generating video key frame offset mapping data that maps offsets of video key frames in the original media file to offsets of corresponding encoded video key frames in an encoded media file to be generated by encoding the original media file;
converting, using the video key frame offset mapping data, the request for a range of compressed data into a request for a range of original data from the original media file, wherein the converting comprises: identifying a first video key frame of the range of original data required to provide to the user equipment, from the encoded data to be generated, the requested range of encoded data; identifying that at least one audio sample associated with the first video key frame precedes the first video key frame in the range of original data; identifying a further video key frame that precedes the first video key frame and the associated at least one audio sample in the range of original data; initiating the range of original data with the further video key frame;
retrieving the range of original data;
compressing the range of original data to generate compressed data; and
providing to the user equipment, from the generated compressed data, the requested range of compressed data.

12. A non-transitory computer readable medium according to claim 11, further comprising:
retrieving first metadata that describes frames in the original media file;
generating second metadata that describes frames in the encoded media file to be generated by encoding the original media file; and generating the video key frame offset mapping data using the first metadata and the second metadata.

13. A non-transitory computer readable medium according to claim 12, further comprising:
using the first metadata to generate the second metadata.

\* \* \* \* \*